(12) United States Patent
Carlson

(10) Patent No.: US 6,589,451 B1
(45) Date of Patent: *Jul. 8, 2003

(54) OPTICAL SHUTTER

(75) Inventor: Steven A. Carlson, Cambridge, MA (US)

(73) Assignee: Optodot Corporation, Boston, MA (US)

(*) Notice: Subject to any disclaimer, the term of this patent is extended or adjusted under 35 U.S.C. 154(b) by 116 days.

This patent is subject to a terminal disclaimer.

(21) Appl. No.: 09/705,118

(22) Filed: Nov. 2, 2000

Related U.S. Application Data

(60) Provisional application No. 60/163,349, filed on Nov. 3, 1999.

(51) Int. Cl.$^7$ .............. F21V 9/04; F21V 9/00; G02F 1/03
(52) U.S. Cl. .............. 252/587; 252/582; 252/589; 359/244
(58) Field of Search .......... 359/244; 252/582, 252/587, 589

(56) References Cited

U.S. PATENT DOCUMENTS

| | | | |
|---|---|---|---|
| 3,251,881 A | | 5/1966 | Susi et al. |
| 3,341,464 A | * | 9/1967 | Sosi ............ 252/587 |
| 3,400,156 A | * | 9/1968 | Milionis ............ 252/587 |
| 4,656,121 A | | 4/1987 | Sato et al. |
| 4,923,390 A | | 5/1990 | Oguchi et al. |
| 5,091,984 A | | 2/1992 | Kobayahi et al. |
| 5,156,938 A | | 10/1992 | Foley et al. |
| 5,171,650 A | | 12/1992 | Ellis et al. |
| 5,256,506 A | | 10/1993 | Ellis et al. |
| 5,399,459 A | | 3/1995 | Simpson et al. |
| 5,406,407 A | | 4/1995 | Wolff |
| 5,501,938 A | | 3/1996 | Ellis et al. |
| 5,539,100 A | | 7/1996 | Wasielewski et al. |
| 5,605,732 A | | 2/1997 | Mihara et al. |
| 5,732,168 A | | 3/1998 | Donald |
| 5,740,287 A | | 4/1998 | Scalora et al. |
| 5,757,525 A | | 5/1998 | Rao et al. |
| 5,828,799 A | | 10/1998 | Donald |
| 5,841,912 A | | 11/1998 | Mueller-Fiedler et al. |
| 5,872,648 A | | 2/1999 | Sanchez et al. |
| 5,905,587 A | | 5/1999 | Maeno et al. |
| 5,923,798 A | | 7/1999 | Aksyuk et al. |
| 5,943,453 A | | 8/1999 | Hodgson |
| 5,948,600 A | | 9/1999 | Roscherger et al. |
| 5,959,749 A | | 9/1999 | Danagher et al. |
| 5,960,133 A | | 9/1999 | Tomlinson |
| 5,970,185 A | | 10/1999 | Baker et al. |
| 6,084,702 A | | 7/2000 | Byker et al. |
| 6,165,389 A | | 12/2000 | Asher et al. |
| 6,171,766 B1 | | 1/2001 | Patel et al. |
| 6,172,795 B1 | * | 1/2001 | Carlson ............ 359/244 |
| 6,381,059 B1 | * | 4/2002 | Carlson ............ 359/244 |

FOREIGN PATENT DOCUMENTS

| | | |
|---|---|---|
| EP | 0 675 003 A1 | 3/1995 |
| WO | WO 98/54615 | 12/1998 |
| WO | 98/54615 | * 12/1998 |

OTHER PUBLICATIONS

Nagamura et al. "Molecular Orientation of Photogenerated Radicals in Novel Photoelectrochromic Langmuir–Blodgett Films", pp. 617 to 619, Thin Solid Films, vol. 210/211, No. 1/2, Part 2, Apr. 30, 1992.

Patent Abstracts of Japan, vol. 005, No. 114 (C–064), Jul. 23, 1981 & JP 56 053177 A (Hitachi Ltd.), May 12, 1981, Abstract, Yasusada (Inventor), "Photochromic Material".

Patent Abstracts of Japan, vol. 1997, No. 12, Dec. 25, 1997 & JP 09 211397 A (Toray Ind. Inc.), Aug. 15, 1997 Abstract, Masao (inventor), "Display Device".

* cited by examiner

*Primary Examiner*—Philip Tucker
(74) *Attorney, Agent, or Firm*—Sampson & Associates, P.C.

(57) ABSTRACT

The present invention pertains to an optical shutter comprising an organic free compound, preferably a radical cation or a radical anion, wherein the organic free radical compound forms an oxidized or a reduced product having a change in absorption in a near-infrared or a visible wavelength region as a result of a photo-induced electron transfer reaction of the free radical compound. Preferably, the photo-induced electron transfer reaction occurs in less than 0.1 nanoseconds after absorption of photons by the free radical compound. Also, preferably, the change in absorption is reversible and occurs in less than 10 milliseconds. Also provided is an optical shutter for use as an optical switch in fiber optic communications, and, alternatively, for use in a laser protection device, a security protection system, and an eyewear device.

55 Claims, No Drawings

OPTICAL SHUTTER

RELATED APPLICATIONS

This application claims priority to U.S. Provisional Patent Application No. 60/163,349, filed Nov. 3, 1999, the disclosure of which is fully incorporated herein for all purposes.

FIELD OF THE INVENTION

The present invention relates to the field of optical shutters and, particularly, pertains to optical shutters which operate in the near-infrared and/or visible wavelength regions. More specifically, this invention pertains to optical shutters comprising an organic free radical compound, wherein the organic free radical compound forms an oxidized or a reduced product having a change in absorption in a near-infrared or a visible wavelength region as a result of a photo-induced electron transfer reaction of the free radical compound.

BACKGROUND OF THE INVENTION

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As the quantity and speed of data communications over fiber optics systems rapidly increases due to the growing demand from Internet usage and other communications, all-optical switching systems are of increased interest to overcome the high cost and slow switching speeds of conventional switches. These conventional switches include, for example, various mechanical switches, electro-optic switches, and thermo-optic switches, such as, for example, described in U.S. Pat. Nos. 5,732,168 and 5,828,799, both to Donald. In particular, the increased complexity and cost of switching systems which involve switching from an optical signal to an electrical signal and then back to an optical signal have increased the level of interest in all-optical switches.

An all-optical switch typically switches an optical signal from one output port to another. This is typically accomplished by applying an input pump signal from a pump laser source to cause the optical signal to be selectively switched. The switch is responsive to the laser pump signal to selectively switch the light of the optical signal to one or the other of the output ports.

A variety of approaches are known for making all-optical or hybrid optical switches, such as, for example, described in U.S. Pat. Nos. 5,905,587 to Maeno et al.; U.S. Pat. No. 5,923,798 to Aksyuk et al.; U.S. Pat. No. 5,970,185 to Baker et al.; U.S. Pat. No. 5,841,912 to Mueller-Fiedler et al.; U.S. Pat. No. 5,757,525 to Rao et al.; U.S. Pat. No. 5,872,648 to Sanchez et al.; U.S. Pat. No. 5,091,984 to Kobayashi et al.; U.S. Pat. No. 5,406,407 to Wolff; U.S. Pat. No. 5,740,287 to Scalora et al.; U.S. Pat. No. 5,960,133 to Tomlinson; and U.S. Pat. No. 5,539,100 to Waslielewski et al. For example, as described in U.S. Pat. No. 5,943,453 to Hodgson, one basic configuration for an all-optical switch is a Mach-Zehnder interferometer which includes a first fiber optic input arm for receiving an input optical signal and a second fiber optic input arm for receiving a switching pump signal. The input arms are fused together to form a first coupler which subsequently branches out into two intermediate arms. The first coupler splits the input light signal into equal portions which then enter the two intermediate arms. The two intermediate arms are once again fused to form a second coupler which branches into two output arms. After traveling through the two intermediate arms, the two signals are recombined by the second coupler. If the two signals are in phase at the second coupler, then all the light is coupled into a first one of the two output ports. If the two signals are completely out of phase, then the light is coupled into the other of the two output ports. The reliability of the Mach-Zehnder interferometer for optical switching is typically sensitive to temperature-dependent effects.

The need for improved optical switches is increased by the use of wavelength add/drop multiplexing (WADM) which converts the optical signal in the optical fiber into, for example, 16 signals at 16 different wavelengths in a near-infrared range of about 1540 to 1560 nm, as, for example, described in Bell Labs Technical Journal, January–March 1999, pages 207 to 229, and references therein, by Giles et al.; and in U.S. Pat. No. 5,959,749 to Danagher et al. There is about 1 nm between the wavelength channels. The primary function of the optical switch is to add and/or drop optical signals from the multiple wavelengths traveling through the optical fiber. It would be highly desirable to have arrays of optical switches to handle the optical signals from multiple wavelengths per optical fiber and from multiple optical fibers, such as up to 100×100 or greater optical switch arrays. Also, it would be highly desirable if the response time for the optical switch is ultrafast, such as I nanosecond or less.

It would be advantageous if an all-optical switching system were available which avoided the complexity and cost of hybrid electro-optic and other systems while increasing the speed of the switching times from the millisecond range to the nanosecond or picosecond ranges.

SUMMARY OF THE INVENTION

An organic free radical compound where the excited state is an excited state from the free radical ground state may have a rapid internal conversion from this excited state back to the ground state with a concomitant production of heat in a time scale of as low as 1 picosecond or less. In one example of this, an organic radical cation compound absorbs photons in the presence of a thermochromic compound, converts the absorbed photons to heat in less than 1 nanosecond, and causes a change in absorption due to heat-induced changes in the thermochromic compound, as described in PCT International Publication No. WO 98/54615, titled "Optical Shutter Device" and published Dec. 3, 1998, to Carlson. The present invention utilizes an organic free radical compound which undergoes a photo-induced electron transfer reaction which causes changes in absorption due to the oxidation or the reduction of the free radical compound. This photo-induced electron transfer reaction may occur faster and with higher efficiency than internal conversion of the absorbed photons to heat or, alternatively, may have a similar or slightly lower speed and efficiency than this internal conversion to heat so that both electron transfer and heat formation processes occur.

One aspect of the present invention pertains to an optical shutter comprising an organic free radical compound in which the free radical compound is characterized by forming an oxidized or reduced product having a change in absorption in a near-infrared wavelength region as a result of a photo-induced electron transfer reaction of the free radical compound. In one embodiment, the free radical compound is a radical cation, preferably an aminium radical cation, and most preferably, the radical cation is tris (p-dibutylaminophenyl) aminium hexafluoroantimonate. In one embodiment, the free radical compound is a radical anion, preferably an anthrasemiquinone radical anion.

In one embodiment of the optical shutter of this invention, the free radical compound is a radical cation, and the optical shutter further comprises a radical anion. In one embodiment, the free radical compound is a radical anion, and the optical shutter further comprises a radical cation. In one embodiment, the free radical compound comprises one or more radical cations and one or more radical anions, and the change in absorption results from a photo-induced electron transfer reaction of at least one of the one or more radical cations and of at least one of the one or more radical anions. In one embodiment, the free radical compound comprises a salt of a radical cation and a radical anion.

In one embodiment of the optical shutter of the present invention, the change in absorption is greater than 0.1, preferably greater than 0.5, and more preferably greater than 1.5. In one embodiment, the near-infrared wavelength region of the change in absorption is from 700 to 1000 nm. In one embodiment, the near-infrared wavelength region of the change in absorption is from 1000 to 1400 nm, preferably from 1400 to 1600 nm, more preferably from 1520 to 1580 nm, and most preferably from 1500 nm to 1700 nm.

In one embodiment of the optical shutter of this invention, the photo-induced electron transfer reaction occurs in less than 1 nanosecond after absorption of photons by the free radical compound, preferably occurs in less than 0.1 nanoseconds, more preferably occurs in less than 0.01 nanoseconds, and most preferably occurs in less than 0.001 nanoseconds or less than 1 picosecond after absorption of photons by the free radical compound.

In one embodiment of the optical shutter of the present invention, the photo-induced electron transfer reaction is an oxidation of the free radical compound. Suitable electron transfer reactions include, but are not limited to, an one-electron oxidation of the free radical compound, a two-electron oxidation of the free radical compound, an one-electron reduction of the free radical compound, and a two-electron reduction of the free radical compound.

In a preferred embodiment of the optical shutter of this invention, the change in absorption is reversible. In one embodiment, the reversible change in absorption is induced by heat. In one embodiment, the reversible change in absorption is induced by radiation selected from the group consisting of: ultraviolet radiation, visible radiation, and infrared radiation; and, preferably, the reversible change in absorption is further induced by the presence of oxygen. In one embodiment, the reversible change in absorption occurs at less than 50° C. in the absence of radiation. In one embodiment, the reversible change in absorption occurs in less than 1 second, preferably occurs in less than 10 milliseconds, more preferably occurs in less than 1 millisecond, and most preferably occurs in less than 0.1 milliseconds.

In one embodiment of the optical shutter of the present invention, the photo-induced electron transfer reaction is induced by ultraviolet radiation. In one embodiment, the photo-induced electron transfer reaction is induced by visible radiation, and preferably is induced by near-infrared radiation. In one embodiment, the photo-induced electron transfer reaction is induced by absorption of photons by a free radical ground state of the free radical compound.

In one embodiment of the optical shutter of this invention, the optical shutter further comprises a metallized layer on at least one side of a layer comprising the free radical compound of the optical shutter. In one embodiment, the metallized layer comprises aluminum.

One aspect of the present invention pertains to an optical shutter comprising an organic radical cation compound in which the radical cation compound is characterized by forming an oxidized or a reduced product having a change in absorption in a near-infrared wavelength region as a result of a photo-induced electron transfer reaction of the radical cation compound. In one embodiment, the optical shutter further comprises a radical anion.

Another aspect of this invention pertains to an optical shutter comprising an organic radical anion compound in which the radical anion compound is characterized by forming an oxidized or a reduced product having a change in absorption in a near-infrared wavelength region as a result of a photo-induced electron transfer reaction of the radical anion compound. In one embodiment, the optical shutter further comprises a radical cation.

Still another aspect of the present invention pertains to an optical shutter comprising one or more radical cations and one or more radical anions, wherein at least one of the radical cations and at least one of the radical anions is characterized by forming an oxidized or a reduced product having a change in absorption in a near-infrared wavelength region as a result of a photo-induced electron transfer reaction of at least one of the one or more radical cations and at least one of the one or more radical anions.

Another aspect of the present invention pertains to an optical shutter comprising an organic free radical compound, preferably a radical cation compound or a radical anion compound, in which the free radical compound is characterized by forming an oxidized or a reduced product having a change in absorption in a visible and/or a near-infrared region as a result of a photo-induced electron transfer reaction of the free radical compound, wherein the change in absorption is reversible. In one embodiment, the optical shutter is utilized in an optical switch for a fiber optics communications channel.

Yet another aspect of this invention pertains to an optical shutter comprising an organic free radical compound in which the free radical compound is characterized by forming an oxidized or a reduced product having a change in absorption in a visible wavelength region as a result of a photo-induced electron transfer reaction of the free radical compound. In one embodiment, the change in absorption is reversible. In one embodiment, the change in absorption is reversible, and the optical shutter is utilized in a viewing lens of an eyewear device.

Another aspect of the present invention pertains to an optical shutter comprising an organic free radical compound in which the free radical compound is characterized by forming an oxidized or a reduced product having a change in absorption in a visible or a near-infrared wavelength region as a result of a photo-induced electron transfer reaction of the free radical compound. In one embodiment, the optical shutter is utilized in a laser protection device for protection of eyes or sensors from a source of laser radiation. In one embodiment, the optical shutter is utilized in a security protection system based on detecting the change in absorption upon exposure of the optical shutter in the security protection system to high intensity radiation selected from the group consisting of: ultraviolet radiation, visible radiation, and infrared radiation.

As will be appreciated by one of skill in the art, features of one aspect or embodiment of the invention are also applicable to other aspects or embodiments of the invention.

DETAILED DESCRIPTION OF THE INVENTION

The optical shutters of the present invention provide superior speed of response, such as a response time of 1000 picoseconds or less, to the incident radiation, and are particularly useful in systems where an all-optical shutter mechanism is desirable.

Organic Free Radical Compounds

The term "organic free radical compounds," as used herein, pertains to organic compounds which comprise at least one free unpaired electron on a neutral atom, such as, for example, a carbon atom, a nitrogen atom, or an oxygen atom, in the ground state of the organic compound. Suitable organic free radical compounds for the optical shutters of the present invention include neutral organic free radicals, organic free radical cations, and organic free radical anions. For purposes of brevity, the terms "organic free radical cation", "organic radical cation", and "radical cation" are used interchangeably herein. The word "cation," as used herein, pertains to a positively charged atom in a molecule, such as, for example, a positively charged nitrogen atom. Similarly, the terms "organic free radical anion", "organic radical anion", and "radical anion" are used interchangeably herein. The word "anion," as used herein, pertains to a negatively charged atom in a molecule, such as, for example, a negatively charged oxygen atom. It should be noted that the free unpaired electron and the positive and negative charges of the organic free radical compounds may be localized on a single atom or shared among more than one atom.

Examples of suitable organic free radical cations for the optical shutters of this invention include, but are not limited to, aminium radical cations, such as, for example, tris (p-dibutylaminophenyl) aminium hexafluoroantimonate, which is commercially available as IR-165, a trademark for a dye available from Glendale Technologies, Inc., Lakeland, Fla. IR-165 is known to be a stable material that may exist in a layer of material, such as in a polymeric coating, under normal room conditions for an extended period of time.

Examples of suitable organic free radical anions for the optical shutters of the present invention include, but are not limited to, anthrasemiquinone radical anions, such as, for example, described in *Photochemistry and Photobiology*, Vol. 17, pages 123–131 (1973) by Carlson and Hercules.

Due to the presence of the free radical moiety, organic free radical compounds have unique longer wavelength absorptions and unique photothermal and photochemical transformations, particularly when compared to the corresponding non-free radical compounds. For example, the absorption spectra of IR-165, a radical cation, and its extremely rapid internal conversion of absorbed photons to heat is described in various publications, such as in PCT International Publication No. WO 98/54615, and refernces therein, to Carlson. Also, for example, the absorption spectra of 9,10-anthrasemiquinone radical anion and its photochemistry are described in the above-referenced publication by Carlson and Hercules and in *The Photochemistry of Anthraquinone and Related Compounds*, Ph.D. Thesis, Massachusetts Institute of Technology, 1969, by Carlson.

An organic free radical compound where the excited state is an excited state from the free radical ground state may have a rapid internal conversion from this excited state back to the ground state with an accompanying production of heat by this photothermal process in a time scale of as low as 1 picosecond or less, as, for example, observed with coatings of IR-165 upon high intensity laser irradiation at 1065 nm where the absorption is from a free radical ground state. The sub-picosecond speed of this photon-to-heat conversion is described, for example, in PCT International Publication No. WO 98/54615, and references therein, to Carlson. The present invention is directed at utilizing organic free radical compounds that undergo a photo-induced electron transfer reaction that competes with and, preferably, exceeds the speed of these photothermal processes for use in an optical shutter where the desired change in absorption upon optical excitation is a result of the formation of an oxidized or a reduced product of the organic free radical compound due to the photo-induced electron transfer reaction.

For example, under oxidative or reductive conditions, a light yellow-green layer comprising IR-165 upon laser exposure at 1065 nm may undergo photo-induced electron transfer reactions which compete efficiently with the ultrafast photothermal processes of IR-165 to produce an oxidized product having a change in absorption in both the visible and the near-infrared wavelength regions or, alternatively, to produce a reduced product having a change in absorption in both the visible and the near-infrared wavelength regions. For example, the oxidized product of IR-165 may be a blue compound from a two-electron photo-induced electron transfer reaction, particularly when the layer of IR-165 comprises a polymer, such as nitrocellulose, which promotes oxidation of IR-165 upon exposure to radiation. Similarly, for example, the reduced product of IR-165 may be an intense green compound from an one-electron photo-induced electron transfer reaction, particularly when the layer of IR-165 comprises a polymer which does not promote oxidation of IR-165 upon exposure to radiation. The green, reduced product of IR-165 has new intense absorption peaks at 950 nm and 1480 nm, in comparison to the absorption of IR-165. Depending on the other materials present in the layer, these blue oxidized or green reduced compounds may be transient compounds and may revert to the starting IR-165 material at various speeds from less than 0.1 milliseconds to many seconds. A photo-induced reaction may be utilized to accelerate the reversion back to the starting IR-165 material.

Also, for example, layers comprising anthrasemiquinone radical anions, including the many possible substituted and other derivatives of the anthrasemiquinone radical anion, may undergo photo-induced electron transfer reactions which occur very rapidly and compete efficiently with the photothermal processes of these radical anions, to produce a reduced product having a change in absorption in both the visible and the near-infrared wavelength regions. This change in absorption typically includes a loss in absorption in the near-infrared wavelength region due to the conversion of the radical anion to a non-free radical compound, such as, for example, a dianion.

Optical Shutters

One aspect of the present invention pertains to an optical shutter comprising an organic free radical compound in which the free radical compound is characterized by forming an oxidized or a reduced product having a change in absorption in a visible and/or a near-infrared wavelength region as a result of a photo-induced electron transfer reaction of the free radical compound. The term "near-infrared wavelength region," as used herein, pertains to wavelengths from 700 nm to 2000 nm. The term "visible wavelength region," as used herein, pertains to wavelengths from 400 to 700 nm. In one embodiment, the free radical compound is a radical cation, preferably an aminium radical cation, and most preferably, the radical cation is tris (p-dibutylaminophenyl) aminium hexafluoroantimonate (TAH). In one embodiment, the free radical compound is a radical anion, preferably an anthrasemiquinone (ASQ) radical anion.

In one embodiment of the optical shutter of this invention, the free radical compound is a radical cation, and the optical shutter further comprises a radical anion. The absorption change occurs as a result of the radical cation forming an oxidized or a reduced product, but the radical anion increases the efficiency of the photo-induced electron transfer reaction.

In one embodiment, the free radical compound is a radical anion, and the optical shutter further comprises a radical cation. The absorption change occurs as a result of the radical anion forming an oxidized or a reduced product, but the radical cation increases the efficiency of the photo-induced electron transfer reaction.

In one embodiment, the free radical compound comprises one or more radical cations and one or more radical anions, and the change in absorption results from a photo-induced electron transfer reaction of at least one of the one or more radical cations and of at least one of the one or more radical anions. The photo-induced electron transfer reaction may involve a joint photooxidation-photoreduction of a radical cation and a radical anion, including, for example, photosensitization of the electron transfer reaction of the radical cation, such as IR-165, by the radical anion, such as ASQ radical anion, or, alternatively, photosensitization of the electron transfer reaction of the radical anion by the radical cation.

In one embodiment, the free radical compound comprises a salt of a radical cation and a radical anion. This association of the radical cation molecules and the radical anion molecules in close proximity to each other, such as, for example, using the ASQ radical anion as the anion for some or all of the IR-165 radical cation, may enhance the speed and efficiency of the photo-induced electron transfer reaction and also of the reverse electron transfer reaction to reform the original free radical compounds.

In one embodiment of the optical shutter of the present invention, the change in absorption is greater than 0.1, preferably greater than 0.5, and more preferably greater than 1.5. These absorption changes are measured in optical density units, as known in the art, where an optical density of 1.0 corresponds to 90% absorption and 10% transmission of the incident wavelength or wavelengths of radiation. Thus, for example, an initial absorption or optical density of the optical shutter of 0.1 at 1546 nm that changes to an absorption or optical density in the optical shutter of 1.6 at 1546 nm would have a change in absorption of 1.6 minus 0.1 or 1.5. In one embodiment, the near-infrared wavelength region of the change in absorption is from 700 to 1000 nm. In one embodiment, the near-infrared wavelength region of the change in absorption is from 1000 to 1400 nm, preferably from 1400 to 1600 nm, more preferably from 1520 to 1580 nm, and most preferably from 1500 to 1700 mn.

In one embodiment of the optical shutter of this invention, the photo-induced electron transfer reaction occurs in less than 1 nanosecond after absorption of photons by the free radical compound, preferably occurs in less than 0.1 nanoseconds, more preferably occurs in less than 0.01 nanoseconds, and most preferably occurs in less than 0.001 nanoseconds.

In one embodiment of the optical shutter of the present invention, the photoinduced electron transfer reaction is an oxidation of the free radical compound. Suitable electron transfer reactions include, but are not limited to, an one-electron oxidation of the free radical compound, a two-electron oxidation of the free radical compound, an one-electron reduction of the free radical compound, and a two-electron reduction of the free radical compound. The oxidation product of a radical cation may be a diradical which may readily undergo reverse electron transfer to regenerate the radical cation. Also, the reduction product of a radical anion may be a dianion which may readily undergo reverse electron transfer to regenerate the radical anion and, in the case of ASQ radical anion and the corresponding dianion, this could involve the controlled presence of oxygen during the reverse electron transfer process.

In a preferred embodiment of the optical shutter of this invention, the change in absorption is reversible. In one embodiment, the reversible change in absorption is induced by heat. In one embodiment, the reversible change in absorption is induced by radiation selected from the group consisting of: ultraviolet radiation, visible radiation, and infrared radiation; and, preferably, the reversible change in absorption is further induced by the presence of oxygen. For example, the ASQ radical anion and the corresponding dianion are both unstable in the presence of oxygen and, in the presence of oxygen, may be oxidized to the corresponding anthraquinone compound, which anthraquinone compound may subsequently be photoreduced or otherwise reduced by known methods to form the corresponding ASQ radical anion. In one embodiment, the reversible change in absorption occurs at less than 50° C. in the absence of radiation. In one embodiment, the reversible change in absorption occurs in less than 1 second, preferably occurs in less than 10 milliseconds, more preferably occurs in less than 1 millisecond, and most preferably occurs in less than 0.1 milliseconds.

In one embodiment of the optical shutter of the present invention, the photoinduced electron transfer reaction is induced by ultraviolet radiation. In one embodiment, the photo-induced electron transfer is induced by visible radiation, and preferably is induced by near-infrared radiation. In one embodiment, the photo-induced electron transfer reaction is induced by absorption of photons by a free radical ground state of the free radical compound. This is particularly important where the excited states of the free radical moiety ground state of the free radical compound can not be efficiently populated by absorption by a non-free radical ground state, such as, for example, by an aromatic moiety ground state, and by its subsequent internal conversion to a lower excited state related to the free radical moiety ground state.

In one embodiment of the optical shutter of this invention, the optical shutter further comprises a metallized layer on at least one side of a layer comprising the free radical compound of the optical shutter. In one embodiment, the metallized layer comprises aluminum. This metallized layer may serve a variety of functions, such as, for example, reflecting more incident radiation back through the optical shutter layer, enhancing heat development in the optical shutter layer, and acting as an enhanced or a reduced reflective element in an optical switch comprising the optical shutter of this invention.

One aspect of the present invention pertains to an optical shutter comprising an organic radical cation compound in which the radical cation compound is characterized by forming an oxidized or a reduced product having a change in absorption in a visible and/or near-infrared wavelength region as a result of a photo-induced electron transfer reaction of the radical cation compound. In one embodiment, the optical shutter further comprises a radical anion.

Another aspect of this invention pertains to an optical shutter comprising an organic radical anion compound in which the radical anion compound is characterized by forming an oxidized or a reduced product having a change in absorption in a visible and/or near-infrared region as a result of a photo-induced electron transfer reaction of the radical anion compound. In one embodiment, the optical shutter further comprises a radical cation.

Still another aspect of the present invention pertains to an optical shutter comprising one or more radical cations and one or more radical anions, wherein at least one of the radical cations and at least one of the radical anions is characterized by forming an oxidized or a reduced product having a change in absorption in a visible and/or near-infrared wavelength region as a result of a photo-induced electron transfer reaction of at least one of the one or more radical cations and at least one of the one or more radical anions.

Another aspect of the present invention pertains to an optical shutter comprising an organic free radical compound, preferably a radical cation compound or a radical anion compound, in which the free radical compound is characterized by forming an oxidized or a reduced product having a change in absorption in a visible and/or near-infrared region as a result of a photo-induced electron transfer reaction of the free radical compound, wherein the change in absorption is reversible. In one embodiment, the optical shutter is utilized in an optical switch for a fiber optics communications channel. For example, an initial optical density of less than 0.1 or greater than 80% transmission in the 1525 to 1575 nm region of interest for the optical switch may be switched to an optical density of greater than 1.6 or less than 2.5% transmission in less than 1 nanosecond and then reversibly switched back to the initial optical density in less than 1 second.

Yet another aspect of this invention pertains to an optical shutter comprising an organic free radical compound in which the free radical compound is characterized by forming an oxidized or a reduced product having a change in absorption in a visible wavelength region as a result of a photo-induced electron transfer reaction of the free radical compound, wherein in one embodiment, the change in absorption is reversible. In one embodiment, the change in absorption is reversible, and the optical shutter is utilized in a viewing lens of an eyewear device, such as, for example, in sunglasses.

Another aspect of the present invention pertains to an optical shutter comprising an organic free radical compound in which the free radical compound is characterized by forming an oxidized or a reduced product having a change in absorption in a visible or a near-infrared wavelength region as a result of a photo-induced electron transfer reaction of the free radical compound. In one embodiment, the optical shutter is utilized in a laser protection device for protection of eyes or sensors from a source of laser radiation. In one embodiment, the optical shutter is utilized in a security protection system based on detecting the change in absorption upon exposure of the optical shutter in the security protection system to high intensity radiation selected from the group consisting of: ultraviolet radiation, visible radiation, and infrared radiation. The high intensity radiation may be produced by a pulsed laser which provides a unique light intensity to trigger the optical shutter, which is not activated under ambient room light and other conventional conditions.

The organic nature of the organic free radical compounds and the optical shutter of the present invention are advantageous for ease of fabrication, such as by conventional methods of coating or plastic molding, in comparison to inorganic glass materials typically used in all-optical or hybrid optical shutters and switches.

While the invention has been described in detail and with reference to specific and general embodiments thereof, it will be apparent to one skilled in the art that various changes and modifications can be made therein without departing from the spirit and scope thereof.

What is claimed is:

1. An optical shutter comprising an organic free radical compound, wherein said free radical compound forms an oxidized or a reduced product having a change in absorption in a near-infrared wavelength region as a result of a photo-induced electron transfer reaction of said free radical compound; and wherein said change in absorption is reversible and said reversible change in absorption occurs at less than 50° C. in the absence of radiation.

2. The optical shutter of claim 1, wherein said free radical compound is a radical cation.

3. The optical shutter of claim 2, wherein said radical cation is an aminium radical cation.

4. The optical shutter of claim 2, wherein said radical cation is tris (p-butylaminophenyl) aminium hexafluoroantimonate.

5. An optical shutter comprising an organic free radical compound, wherein said free radical compound forms an oxidized or a reduced product having a change in absorption in a near-infrared wavelength region as a result of a photo-induced electron transfer reaction of said free radical compound; and wherein said free radical compound is a radical anion.

6. The optical shutter of claim 5, wherein said radical anion is an anthrasemiquinone radial anion.

7. An optical shutter comprising an organic free radical compound, wherein said free radical compound forms an oxidized or a reduced product having a change in absorption in a near-infrared wavelength region as a result of a photo-induced electron transfer reaction of said free radical compound; and wherein said free radical compound is a radical cation and said optical shutter further comprises a radical anion.

8. The optical shutter of claim 5, wherein said optical shutter further comprises a radical cation.

9. An optical shutter comprising an organic free radical compound, wherein said free radical compound forms an oxidized or a reduced product having a change in absorption in a near-infrared wavelength region as a result of a photo-induced electron transfer reaction of said free radical compound; and wherein said free radical compound comprises one or more radical cations and one or more radical anions, and further wherein said change in absorption results from a photo-induced electron transfer reaction of at least one of said one or more radical cations and of at least one of said one or more radical anions.

10. An optical shutter comprising an organic free radical compound, wherein said free radical compound forms an oxidized or a reduced product having a change in absorption in a near-infrared wavelength region as a result of a photo-induced electron transfer reaction of said free radical compound; and wherein said free radical compound comprises a salt of a radical cation and a radical anion.

11. The optical shutter of claim 1, wherein said change in absorption is greater than 0.1 in optical density.

12. The optical shutter of claim 1, wherein said change in absorption is greater than 0.5 in optical density.

13. The optical shutter of claim 1, wherein said change in absorption is greater than 1.5 in optical density.

14. The optical shutter of claim 1, wherein said near-infrared wavelength region is from 700 to 1000 nm.

15. The optical shutter of claim 1, wherein said near-infrared wavelength region is from 1000 to 1400 nm.

16. The optical shutter of claim 1, wherein said near-infrared wavelength region is from 1400 to 1600 nm.

17. The optical shutter of claim 1, wherein said near-infrared wavelength region is from 1520 to 1580 nm.

18. The optical shutter of claim 1, wherein said near-infrared wavelength region is from 1500 to 1700 nm.

19. The optical shutter of claim 1, wherein said photo-induced electron transfer reaction occurs in less than 1 nanosecond after absorption of photons by said free radical compound.

20. The optical shutter of claim 1, wherein said photo-induced electron transfer reaction occurs in less than 0.1 nanoseconds after absorption of photons by said free radical compound.

21. The optical shutter of claim 1, wherein said photo-induced electron transfer reaction occurs in less than 0.01 nanoseconds after absorption of photons by said free radical compound.

22. The optical shutter of claim 1, wherein said photo-induced electron transfer reaction occurs in less than 0.001 nanoseconds after absorption of photons by said free radical compound.

23. The optical shutter of claim 1, wherein said photo-induced electron transfer reaction is an oxidation of said free radical compound.

24. The optical shutter of claim 1, wherein said photo-induced electron transfer reaction is an one-electron oxidation of said free radical compound.

25. An optical shutter comprising an organic free radical compound, wherein said free radical compound forms an oxidized or a reduced product having a change in absorption in a near-infrared wavelength region as a result of a photo-induced electron transfer reaction of said free radical compound; and wherein said photo-induced electron transfer reaction is a two-electron oxidation of said free radical compound.

26. An optical shutter comprising an organic free radical compound, wherein said free radical compound forms an oxidized or a reduced product having a change in absorption in a near-infrared wavelength region as a result of a photo-induced electron transfer reaction of said free radical compound; and wherein said photo-induced electron transfer reaction is a reduction of said free radical compound.

27. The optical shutter of claim 26, wherein said photo-induced electron transfer reaction is an one-electron reduction of said free radical compound.

28. The optical shutter of claim 26, wherein said photo-induced electron transfer reaction is a two-electron reduction of said free radical compound.

29. The optical shutter of claim 25, wherein said change in absorption is reversible.

30. The optical shutter of claim 1, wherein said reversible change in absorption is induced by heat.

31. The optical shutter of claim 1, wherein said reversible change in absorption is induced by radiation selected from the group consisting of ultraviolet radiation, visible radiation, and infrared radiation.

32. An optical shutter comprising an organic free radical compound, wherein said free radical compound forms an oxidized or a reduced product having a change in absorption in a near-infrared wavelength region as a result of a photo-induced electron transfer reaction of said free radical compound; and wherein said reversible change in absorption is induced by the combination of the presence of oxygen and of radiation selected from the group consisting of ultraviolet radiation, visible radiation, and infrared radiation.

33. The optical shutter of claim 29, wherein said reversible change in absorption occurs at less than 50° C. in the absence of radiation.

34. The optical shutter of claim 1, wherein said reversible change in absorption occurs in less than 1 second.

35. The optical shutter of claim 1, wherein said reversible change in absorption occurs in less than 10 milliseconds.

36. The optical shutter of claim 1, wherein said reversible change in absorption occurs in less than 1 millisecond.

37. The optical shutter of claim 1, wherein said reversible change in absorption occurs in less than 0.1 milliseconds.

38. The optical shutter of claim 1, wherein said photo-induced electron transfer reaction is induced by ultraviolet radiation.

39. The optical shutter of claim 1, wherein said photo-induced electron transfer reaction is induced by visible radiation.

40. The optical shutter of claim 1, wherein said photo-induced electron transfer reaction is induced by near-infrared radiation.

41. The optical shutter of claim 1, wherein said photo-induced electron transfer reaction is induced by absorption of photons by a free radical ground state of said free radical compound.

42. The optical shutter of claim 1, wherein said optical shutter further comprises a metallized layer on at least one side of a layer comprising said free radical compound of said optical shutter.

43. The optical shutter of claim 42, wherein said metallized layer comprises aluminum.

44. An optical shutter comprising an organic radical cation compound, wherein said radical cation compound forms an oxidized or a reduced product having a change in absorption in a near-infrared wavelength region as a result of a photo-induced electron transfer reaction of said radical cation compound; and wherein said change in absorption is reversible and said reversible change in absorption occurs at less than 50° C. in the absence of radiation.

45. The optical shutter of claim 44, wherein said optical shutter further comprises a radical anion.

46. An optical shutter comprising an organic radical anion compound, wherein said radical anion compound is characterized by forming an oxidized or a reduced product having a change in absorption in a near-infrared wavelength region as a result of a photo-induced electron transfer reaction of said radical anion compound.

47. The optical shutter of claim 46, wherein said optical shutter further comprises a radical cation.

48. An optical shutter comprising one or more radical cations and one or more radical anions, wherein at least one of said radical cations and at least one of said radical anions is characterized by forming an oxidized or a reduced product having a change in absorption in a near-infrared wavelength as a result of a photo-induced electron transfer reaction of said at least one radical cation and said at least one radical anion.

49. An optical shutter comprising an organic radical anion compound, wherein said radical anion compound is characterized by forming an oxidized or a reduced product having a change in absorption in a near-infrared wavelength region as a result of a photo-induced electron transfer reaction of said radical anion compound; wherein said change in absorption is reversible.

50. An optical shutter comprising an organic free radical compound, wherein said free radical compound forms an oxidized or a reduced product having a change in absorption in a visible wavelength region as a result of a photo-induced electron transfer reaction of said free radical compound; and wherein said change in absorption is reversible and said reversible change in absorption occurs at less than 50° C. in the absence of radiation.

51. An optical shutter comprising an organic free radical compound, wherein said free radical compound forms an oxidized or a reduced product having a change in absorption in a near-infrared wavelength region as a result of a photo-induced electron transfer reaction of said free radical compound; and wherein said change in absorption is reversible and said reversible change in absorption occurs at less than 50° C. in the absence of radiation, and further wherein said optical shutter is utilized in an optical switch for a fiber optics communications channel.

52. An optical shutter comprising an organic free radical compound, wherein said free radical compound forms an oxidized or a reduced product having a change in absorption in a visible or a near-infrared wavelength region as a result of a photo-induced electron transfer reaction of said free radical compound; and wherein said change in absorption is reversible and said reversible change in absorption occurs at less than 50° C. in the absence of radiation, and further wherein said optical shutter is utilized in a laser protection device for protection of eyes or sensors from a source of laser radiation.

53. An optical shutter comprising an organic free radical compound, wherein said free radical compound forms an oxidized or a reduced product having a change in absorption in a visible or a near-infrared wavelength region as a result of a photo-induced electron transfer reaction of said free radical compound; and wherein said change in absorption is reversible and said reversible change in absorption occurs at less than 50° C. in the absence of radiation, and further wherein said optical shutter is utilized in a security protection system based on detecting said change in absorption upon exposure of said optical shutter in said security protection system to radiation selected from the group consisting of ultraviolet radiation, visible radiation, and infrared radiation.

54. An optical shutter comprising an organic free radical compound, wherein said free radical compound forms an oxidized or a reduced product having a change in absorption in a visible wavelength region as a result of a photo-induced electron transfer reaction of said free radical compound; and wherein said change in absorption is reversible and said reversible change in absorption occurs at less than 50° C. in the absence of radiation, and further wherein said optical shutter is utilized in a viewing lens of an eyewear device.

55. The optical shutter of claim 26, wherein said change in absorption is reversible.

* * * * *